Jan. 16, 1940. G. H. HARPER 2,187,687
MEAT SALTER
Filed June 5, 1939
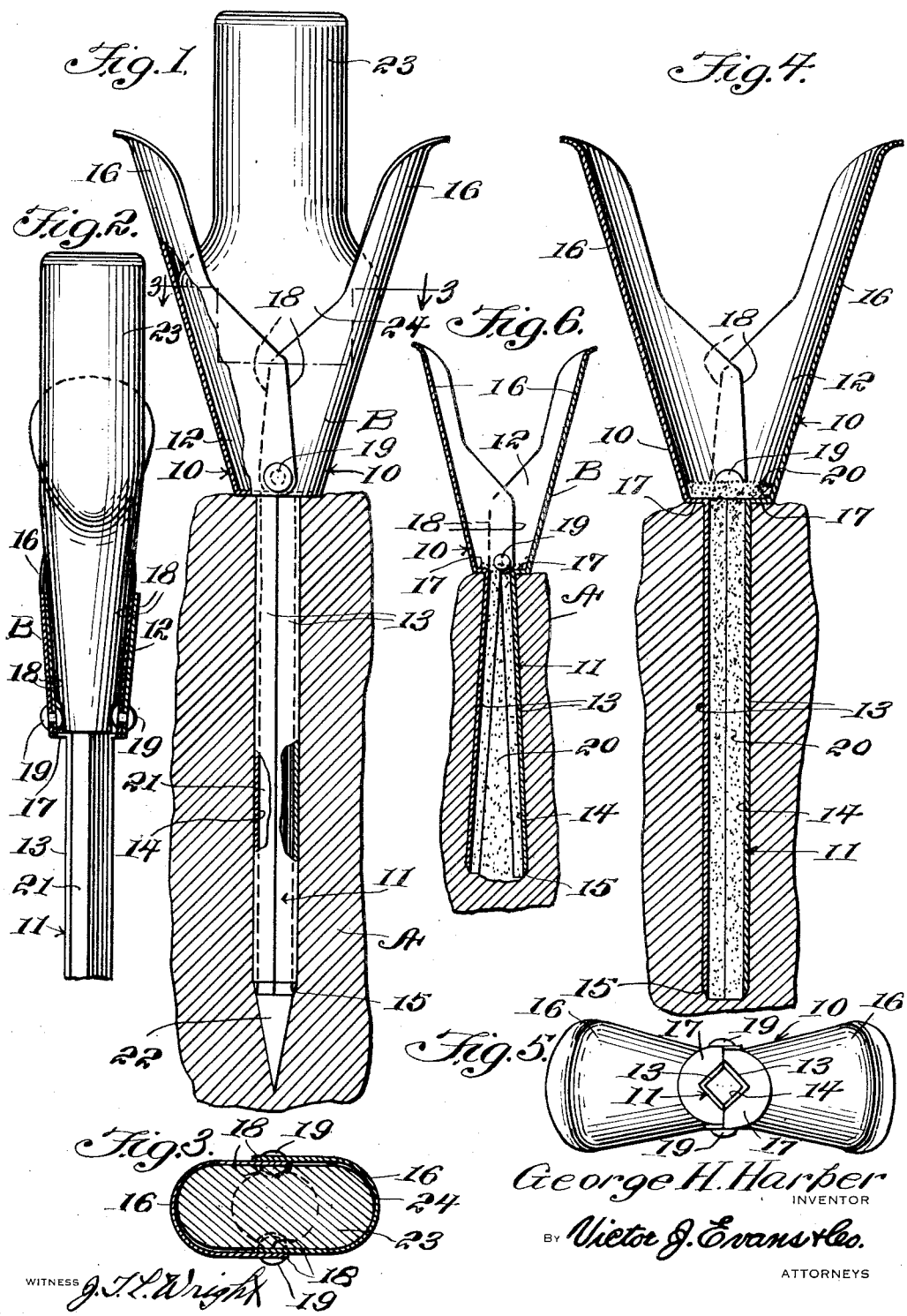
George H. Harper, INVENTOR
By Victor J. Evans & Co. ATTORNEYS Patented Jan. 16, 1940

2,187,687

UNITED STATES PATENT OFFICE 2,187,687

MEAT SALTER

George H. Harper, Oklahoma City, Okla.

Application June 5, 1939, Serial No. 277,551

2 Claims. (Cl. 99—256)

The invention relates to a piercing appliance for use in curing meats and more especially to a meat salting implement.

The primary object of the invention is the provision of an implement of this character wherein a piercing tine or pin is adapted for interfitting a feed nozzle tool so that the latter can be carried into a body of meat, the tine or pin being adapted to create or open a way for the said tool so that salt can be delivered into the meat for curing the same, the tool being constructed to serve as a spreading funnel whereby salt placed therein will be fed into the way in the meat in a convenient manner on removal of the piercing tine or pin from the tool after insertion of the latter within the meat.

Another object of the invention is the provision of an instrument of this character wherein the tine or pin for interfitting with the tool thereof carries a wedging handle which is adapted to act upon the tool to maintain the latter in a condition during insertion thereof into meat for excluding the same from entry into the tool and in this way avoiding stoppage within the tool for the free feeding or passage of salt therethrough for deposit within the meat, the delivery operation of the tool being effected for the deposit of the salt within the meat on removal of the tine or pin therefrom.

A further object of the invention is the provision of an implement of this character wherein the tool for the feeding of salt into meat involves pivotally connected parts, these being spreadable after insertion of a nozzle end thereof into the meat so that salt delivered thereby can become deposited in the said meat while these parts create a funnel acting end receptive to salt so that it will flow for deposit in the meat through the nozzle end of such tool on spreading thereof, the tool being advanced to a penetrating position within the meat by a piercing tine or pin which initially interfits with the nozzle and funnel-like ends of said tool and on interfitting thereof eliminates any possibility of the spreading of the parts of the tool and assures proper penetrating advancement thereto within the meat.

A still further object of the invention is the provision of an implement of this character wherein unskilled operators can readily cure meat by insertion of salt therein, the meat being readily and easily pierced for the deposit of salt therein.

A still further object of the invention is the provision of an implement of this character which is simple in its construction, thoroughly reliable and efficient in operation, susceptible of manual handling for meat salting purposes, strong, durable and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention and pointed out in the claims hereunto appended.

In the accompanying drawing:

Figure 1 is a side elevation, partly in section, of an implement constructed in accordance with the invention and in assembled condition for meat piercing purposes.

Figure 2 is a fragmentary vertical longitudinal sectional view through the implement.

Figure 3 is a sectional view taken on the line 3—3 of Figure 1 looking in the direction of the arrows.

Figure 4 is a vertical longitudinal sectional view through the implement showing the piercing tine or pin removed and the tool in a non-spreading condition.

Figure 5 is an end elevation.

Figure 6 is a view similar to Figure 4 showing the tool in a spread condition illustrating the deposit of salt within the meat.

Similar reference characters indicate corresponding parts throughout the several views in the drawing.

Referring to the drawing in detail, A designates generally a portion of a piece of meat to be cured by salting thereof and B the salting implement respectively.

The salting implement B comprises a tool involving a pair of lever-like parts 10 which are formed to present an elongated nozzle-like portion 11 and a funnel-like portion 12, respectively. The nozzle-like portion 11 is constituted by opposed channeled jaws 13, these being in matched relation to each other and are of substantially L-form in cross section so that when these jaws 13 are closed one to the other the cross sectional formation of the nozzle portion 11 will be substantially square creating a correspondingly shaped passage 14 throughout the extent of said nozzle portion. The free ends of these jaws 13 are reversely beveled at 15 to present a knife edge to the nozzle portion 11 for assuring easy penetration thereof within the meat.

The funnel-like portion 12 of the tool is constituted by opposed hollowed or concavo-convexed handles 16, these being outwardly arched in cross section and join the jaws 13 at the shouldered area 17 therebetween. Next to this area 17 and engaged in overlaps 18 to the handles 16 are pivots 19 connecting the two parts of the said tool so that when pressure is applied to the handle 16 and the funnel-like portion 12 is emptied the jaws 13 can be spread apart from each other, this being effected when the nozzle portion 11 has been advanced into the meat, a portion thereof being indicated at A.

When the funnel-like end 12 constituted by the handles 16 is empty and the nozzle portion 11 has been extended into the meat the said funnel-like portion receives a charge of salt and the latter by gravity falls into the nozzle-like portion 11 then by pressing upon the handles 16 the jaws constituting the nozzle-like portion can be spread apart with the result that a deposit of salt will occur in the meat, the salt being indicated at 20 for the curing of the meat.

The implement in addition to the tool includes a piercing element involving a piercing tine or pin 21 having a pointed outer end or tip 22 and a grip or handle end 23, the latter being formed with a wedging area 24 which is accommodated between the handles 16 of the tool when the latter are in position to have the jaws 13 in abutting matched relation to each other as will appear from Figure 1 of the drawing. The tine or pin 21 is adapted for telescopically fitting within the nozzle portion 11 of the tool and is of a length slightly greater than this portion 11 so that its tip or end 22 protrudes beyond the knife edge 15. In this position of the tine or pin 21 the wedging area 24 of the grip or handle 23 will have been inserted in the funnel-like portion 12 of the tool as created by the handle 16 with the result that the jaws 13 be sustained in matched contacting relation to each other and thereby eliminating seepage of the fibers of the meat to between the said jaws 13 and the tine or pin 21. In this way stoppage in the nozzle portion 11 is avoided when the implement is forced into the meat A. After the tool, that is, the nozzle portion 11, has been fully inserted in the meat the tine or pin 21 is extracted from said tool and thereafter salt 20 is poured into the funnel-like portion 12 to flow into the nozzle portion 11 of said tool. When this nozzle portion 11 is filled with the salt, pressure is applied to the handle 16 spreading the jaws 13 apart from each other with the result that the salt 20 will become deposited in the meat filling the way created therein both by the tool and the piercing implement.

The jaws 13 cannot spread apart from each other until the tine or pin 21 with the area 24 of the grip or handle 23 have become withdrawn from the tool. It is of course understood that the implement involves the tool and the piercing element, these being interfitted with each other for enabling convenient deposit of salt within the meat. The piercing element acts as a pilot for the tool and when withdrawn from the latter salt can be deposited within the meat therethrough for the curing of the said meat.

The shoulder area 17 limits the insertion of the jaws 13 constituting the nozzle portion 11 into the meat.

What is claimed is:

1. A meat salter comprising a salt feeding tool having pivotally connected jaws for opening and closing movements with relation to each other and forming a nozzle when closed with respect to each other, handles continued from said jaws in overlapped interfitted relation to each other for forming a feeding funnel communicative with the nozzle when the jaws are closed with relation to each other, and a piercing element having a pointed tine interfitting the said jaws when closed with respect to each other on insertion of said element through said funnel and having a wedging grip for wedging engagement in the funnel between the handles for holding the jaws together when the pointed tine is interfitted therewith.

2. A meat salter comprising a salt feeding tool having pivotally connected jaws for opening and closing movements with relation to each other and forming a nozzle when closed with respect to each other, handles continued from said jaws in overlapped interfitted relation to each other for forming a feeding funnel communicative with the nozzle when the jaws are closed with relation to each other, a piercing element having a pointed tine interfitting the said jaws when closed with respect to each other on insertion of said element through said funnel and having a wedging grip for wedging engagement in the funnel between the handles for holding the jaws together when the pointed tine is interfitted therewith, and beveled knife edges formed at the outer free ends of said jaws.

GEORGE H. HARPER.